March 1, 1949.
J. W. LATCHUM, JR
2,463,187
DEHYDRATION OF HYDROGEN CHLORIDE-HYDROCARBON
MIXTURES BY DISTILLATION
Filed Jan. 3, 1944
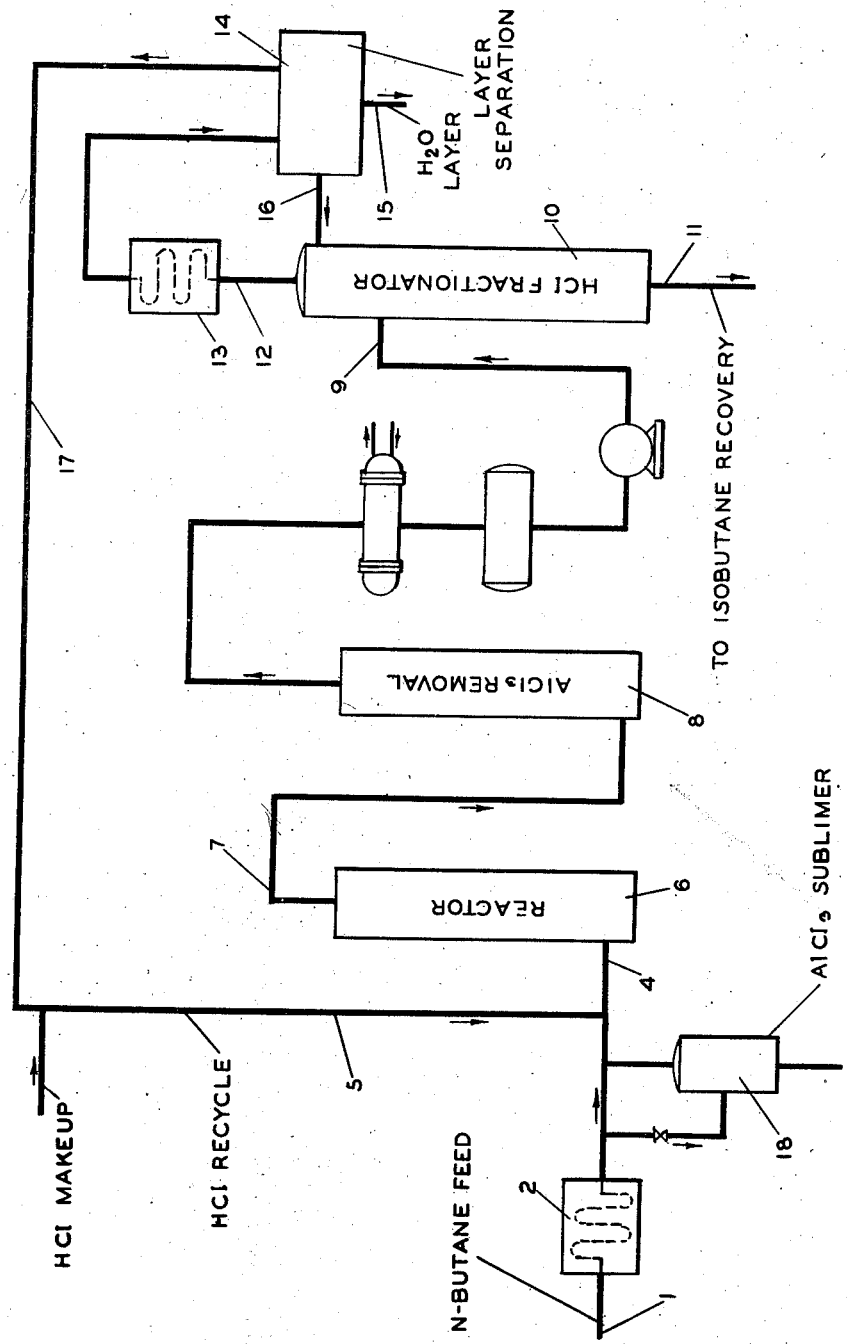
INVENTOR
J. W. LATCHUM, JR.
BY Hudson, Young and Yinger
ATTORNEYS Patented Mar. 1, 1949

2,463,187

UNITED STATES PATENT OFFICE 2,463,187

DEHYDRATION OF HYDROGEN CHLORIDE-HYDROCARBON MIXTURES BY DISTILLATION

John W. Latchum, Jr., Bartlesville, Okla., assignor to Phillips Petroleum Company, a corporation of Delaware Application January 3, 1944, Serial No. 516,883

3 Claims. (Cl. 202—56)

This invention relates to the removal of water from hydrogen chloride-hydrocarbon mixtures and more particularly to the removal of water from such mixtures obtained in the isomerization of normal butane to isobutane by means of aluminum chloride in the presence of hydrogen chloride. Still more particularly it relates to the removal of water concomitantly with the fractionation of the isomerization effluent to recover the hydrogen chloride contained therein for recycle to the reaction zone.

The principal object of the present invention is to provide a method for separating water from hydrogen chloride-hydrocarbon mixtures. Another object is to provide such a method for removing water from concentrated hydrogen chloride-hydrocarbon mixtures. Another object is to provide such a method which effects removal of water in conjunction with the fractionation to recover a recycle hydrogen chloride stream containing the hydrogen chloride in admixture with hydrocarbons comprising chiefly propane and lighter. Another object is to provide a method of the foregoing type wherein the hydrogen chloride content of the recycle stream is greater than 65 per cent by weight of HCl. Another object is to provide a method of the foregoing type which involves a minimum of additional expense and which effects a substantially complete removal of water from the recycle concentrated hydrogen chloride stream. Numerous other objects will hereinafter appear.

In hydrocarbon conversion processes using aluminum chloride as the catalyst, great care is used in keeping moisture from the catalyst. Aluminum chloride forms a hydrocarbon-aluminum chloride complex sludge which soon becomes inactive thereby rendering expensive aluminum chloride useless. The less sludge formed in a hydrocarbon conversion process of this type, the greater the activity and the longer the life of the catalyst and moreover the lower the chemical cost of the process. As moisture comes in contact with the catalyst hydrogen chloride is formed and the formation of sludge is increased.

When normal butane is isomerized to isobutane, aluminum chloride and hydrogen chloride may be used to catalyze the reaction. In a typical process the normal butane and hydrogen chloride are dried, contacted with aluminum chloride in a primary reaction chamber and passed thence into a secondary chamber which contains "Porocel" or other adsorbent upon which the aluminum chloride contained in the effluent from the primary chamber is deposited. The effluent from the secondary chamber is then passed through any suitable means for removing volatilized aluminum chloride therefrom, as for example, through a guard chamber packed with "Porocel" or equivalent adsorbent or, more preferably, through a scrubbing tower countercurrently to concentrated sulfuric acid. In this way aluminum chloride is removed from the effluent vapors before they are passed into the first fractionator wherein hydrogen chloride is removed for recycle. The hydrogen chloride is removed in admixture with hydrocarbons which typically would contain about 60 per cent methane, 3 per cent ethane, 25 per cent propane and a balance of about 12 per cent of butanes. Some hydrogen may also be present. The recycle stream usually contains more than 65 per cent of hydrogen chloride, the balance being hydrocarbon and water.

Moisture may be present in objectionable amounts in the isomerization of normal butane in accordance with the foregoing even though precautions have been taken to keep moisture from within the system. This moisture may have entered the hydrocarbon stream by being desorbed from the "Porocel" or equivalent adsorbent contained in the secondary chamber, from incomplete drying of the feed, from the use of sulfuric acid which contains more than 15 per cent water in the scrubbing step, from opening the system to the atmosphere for charging catalysts or repairing, from the backing up of aqueous solution from the caustic wash through which the kettle product from the first or HCl fractionator passes prior to entry into the usual isobutane fractionation system, or by other means. Various methods have been used to remove and keep moisture from the recycle streams, but in spite of all precautions moisture appears in the system from time to time.

In accordance with the present invention practically all of the moisture which enters the HCl fractionator is removed from the system, concomitantly with the fractionation to remove HCl. As pointed out above, hydrogen chloride recycle is separated in this fractionating column from the heavier hydrocarbons. This hydrogen chloride together with hydrocarbons as mentioned above and occasionally hydrogen, along with most of the water contained in the feed to this fractionator, is removed as an overhead product. In conventional practice this overhead product is at least partially condensed and at least part of the condensate is returned to the top of the HCl fractionator as reflux, the balance of the overhead constituting the recycle stream.

I have found that water may be separated as a separate phase from the hydrogen chloride-hydrocarbon mixture in the condensate accumulator or at some other convenient point. In the practice of the present invention a water trap may be placed in the line through which the reflux returns from the partial condenser to the top of the HCl fractionator or at any other point in the lines or vessels carrying or containing the liquid condensate. The water which settles in the trap may be periodically or continuously drained from the liquid condensate by means of this trap.

The process of the present invention, in its broader aspect, involves effecting removal of water from a vaporized mixture containing hydrocarbons, hydrogen chloride and water by at least partially condensing the mixture, allowing the condensate to separate into a hydrocarbon-hydrogen chloride layer and an aqueous layer, and separating these layers. Preferably sufficient of the mixture is condensed that substantially all or all of the water is condensed. Often the entire mixture is condensed. The vaporized mixture preferably contains such an amount of hydrogen chloride with respect to the water content that the hydrogen chloride constitutes more than 67 per cent by weight of the weight of hydrogen chloride and water contained in the vaporous hydrogen chloride-hydrocarbon-water mixture. The hydrocarbon-hydrogen chloride phase separated as above is substantially free of water, usually containing not over 0.2 per cent by weight of water.

In a more specific aspect the present invention involves passing a feed containing hydrogen chloride, light hydrocarbons, heavier hydrocarbons, and an objectionable amount of water into a fractionating zone wherein the hydrogen chloride, most of the water, and the light hydrocarbons are substantially completely separated from the heavy hydrocarbons, at least partially condensing this overhead of hydrogen chloride and hydrocarbons comprising mainly three carbon atoms, and lighter hydrocarbons allowing the condensate to separate into two layers, an upper layer of hydrogen chloride and hydrocarbons practically free from water and a lower layer which is aqueous, and withdrawing this aqueous layer. The top of the column is usually refluxed with the necessary amount of the hydrogen chloride-hydrocarbon phase.

Preferably the invention is applied to the effluent from the isomerization of normal butane by means of aluminum chloride and hydrogen chloride. Preferably this effluent has been freed from vaporized AlCl₃. In such case the reaction effluent and feed to the HCl fractionator consists essentially of hydrogen chloride, propane and lighter hydrocarbons, and C₄ hydrocarbons consisting of normal butane and isobutane, together with such water as has been backed up in the system or was present in the original feed. This effluent is fractionally distilled in the HCl fractionator to separate substantially all of the normal butane and isobutane as a bottom product in admixture with any heavier hydrocarbons which may be inevitably formed in the reaction. The overhead from this HCl fractionator consists essentially of hydrogen chloride, C₃ and lighter hydrocarbons and most of the water in the fractionator feed. The overhead is at least partially condensed. This condensation effects liquefaction of practically all of the water and of a substantial portion of the HCl and hydrocarbons, namely at least enough to form the reflux. The condensate separates into two layers. The upper layer consists essentially of hydrogen chloride and C₃ hydrocarbons and lighter and usually contains more than 65 per cent hydrogen chloride by weight. This upper layer is substantially anhydrous, containing not more than a few tenths of a per cent by weight of dissolved water. It has been found that the liquid hydrogen chloride-hydrocarbon layer will dissolve only a few tenths of a per cent of water. The aqueous layer comprises water saturated with respect to hydrogen chloride. These two layers are separately withdrawn. At least a portion of the upper layer is passed as reflux to the top of HCl fractionator. Any balance of the upper layer together with any uncondensed overhead is passed as recycle to the isomerization unit. The withdrawn aqueous layer may be discarded where it amounts to only a few gallons a day. If desired, the aqueous layer may be passed to a suitable concentrating means for recovering anhydrous HCl therefrom. This aqueous layer is saturated with hydrogen chloride at the pressure prevailing and so may contain up to about 67 per cent hydrogen chloride by weight.

The invention is preferably applied to those HCl-hydrocarbon-water mixtures in vaporous form which contain such an amount of hydrogen chloride with respect to water as would give more than 67 per cent of HCl by weight based on the weight of HCl and water only. Usually the amount of water is so small that the hydrogen chloride is present in amount at least equal to 90 per cent by weight based on the weight of hydrogen chloride and water taken by themselves.

When normal butane is being isomerized, the fractionating column in which the hydrogen chloride is separated may operate with a kettle temperature of 200–300° F., more preferably about 235° F., and overhead temperature of 75–150° F., more preferably 100° F., and 350–450 pounds per square inch pressure, more preferably 400 pounds per square inch.

Referring to the drawing, n-butane feed enters via line 1, is preheated in 2 and fed via line 4, in admixture with recycle HCl entering via line 5, to reactor 6, the operation of which forms no part of this invention. The effluent, usually vaporous, passes via line 7 to AlCl₃-removal means 8 of any suitable type. The effluent is condensed and pumped via line 9 to HCl fractionator 10, whence a bottoms product containing substantially all or all of the C₄ hydrocarbons and any heavier is removed via line 11. The overhead is removed via line 12, partially or completely condensed in condenser 13 and the liquid is passed to any suitable layer separation means 14 in which the layer formation takes place. The lower water layer is drawn off via line 15. The upper layer is at least in part passed via line 16 to the top of column 10 as reflux. Any uncondensed overhead in admixture with any balance of the upper layer are recycled via lines 17 and 5.

To charge the reactor 6 with aluminum chloride, the hot feed may be passed through AlCl₃ sublimer 18, the recycle in line 5 being preferably discontinued during this operation.

In some cases, depending upon the pressure, temperature and proportions of hydrogen chloride and hydrocarbon relative to one another in the vaporized mixture and irrespective of the water content, three layers may form, one being hydrocarbon containing dissolved HCl and water, the second being hydrogen chloride containing dissolved water and hydrocarbon, and the third being water containing dissolved hydrogen chloride and hydrocarbon. In such case the hydrocarbon layer will be employed as the reflux for column 10 unless it is insufficient in amount in which event it will be supplemented by at least a portion of the hydrogen chloride layer to give the required amount of reflux.

From the foregoing it will be seen that the present invention involves a simple, unique and advantageous means of recovering water from vaporized hydrogen chloride-hydrocarbon mixtures, especially from the overhead from a HCl fractionator operating on the effluent from the isomerization of normal butane. Numerous other advantages of the process of the present invention will be apparent to those skilled in the art.

While the foregoing description gives certain details as to the preferred mode of operation and illustrates the process as applied to the isomerization of normal butane, it is to be understood that the invention is not limited to the illustrative details given but is to be taken as limited only by the terms or spirit of the appended claims.

I claim:

1. In a process for the isomerization of normal butane in the presence of aluminum chloride and hydrogen chloride wherein the aluminum chloride free effluent from the isomerization reaction contains hydrogen chloride, propane and lighter hydrocarbons, normal butane, isobutane and water, that improvement which comprises passing said aluminum chloride free effluent into a fractional distillation column and therein fractionally distilling the same, withdrawing an overhead containing hydrogen chloride, propane, lighter hydrocarbons and water, said overhead containing hydrogen chloride in excess of 67 per cent of the weight of hydrogen chloride and water, withdrawing a bottoms product containing normal butane, isobutane and any heavier hydrocarbons present, at least partially condensing said overhead, allowing the condensate to separate into two liquid layers, namely, a hydrocarbon-hydrogen chloride layer substantially free from water and an aqueous layer composed of water saturated with hydrogen chloride, separately withdrawing the layers and recycling the substantially anhydrous hydrocarbon-hydrogen chloride layer to the isomerization zone.

2. In a process for the isomerization of normal butane in the presence of aluminum chloride and hydrogen chloride wherein the aluminum chloride free effluent from the isomerization reaction contains hydrogen chloride, propane and lighter hydrocarbons, normal butane, isobutane and water, that improvement which comprises passing said aluminum chloride free effluent into a fractional distillation column and therein fractionally distilling the same, withdrawing an overhead containing hydrogen chloride, propane, lighter hydrocarbons and water, said overhead containing hydrogen chloride in excess of 67 per cent of the weight of hydrogen chloride and water, withdrawing a bottoms product containing normal butane, isobutane and any heavier hydrocarbons present, at least partially condensing said overhead, allowing the condensate to separate into two liquid layers, namely, a hydrocarbon-hydrogen chloride layer substantially free from water and an aqueous layer composed of water saturated with hydrogen chloride, separately withdrawing the layers, refluxing the top of the column with a portion of said hydrocarbon-hydrogen chloride layer, adding the balance of said hydrocarbon-hydrogen chloride layer to any uncondensed overhead and recycling the resulting mixture to the isomerization zone.

3. The process of claim 2 wherein the amount of water in the feed mixture is so small and the amount of water in the overhead is so small that the overhead contains hydrogen chloride in amount at least equal to 90 per cent by weight based on the weight of hydrogen chloride and water.

JOHN W. LATCHUM, JR.

REFERENCES CITED

The following references are of record in the file of this patent:

UNITED STATES PATENTS

| Number | Name | Date |
| --- | --- | --- |
| 2,188,254 | Smithuysen | Jan. 23, 1940 |
| 2,317,241 | Ackerman | Apr. 20, 1943 |
| 2,322,800 | Frey | June 29, 1943 |
| 2,324,755 | Beamer | July 20, 1943 |
| 2,330,206 | Dryer | Sept. 28, 1943 |
| 2,342,124 | Danforth | Feb. 22, 1944 |
| 2,351,461 | Smith | June 13, 1944 |
| 2,378,079 | Hays | June 12, 1945 |